(12) United States Patent
Grundvig et al.

(10) Patent No.: US 6,434,394 B1
(45) Date of Patent: Aug. 13, 2002

(54) MULTIPLE HANDSET CORDLESS TELEPHONE INCLUDING A RING SIGNAL/CALL ROUTING MODULE

(75) Inventors: Jeffrey Paul Grundvig, Macungie; Kenneth Alan Newton, Kutztown, both of PA (US)

(73) Assignee: Lucent Technologies Inc., Murray Hill, DE (US)

(*) Notice: Subject to any disclaimer, the term of this patent is extended or adjusted under 35 U.S.C. 154(b) by 0 days.

(21) Appl. No.: 09/165,157

(22) Filed: Oct. 2, 1998

(51) Int. Cl.[7] .......................... H04Q 7/20; H04M 3/42; H04M 1/56; H04M 15/06; H04M 1/60
(52) U.S. Cl. .................... 455/463; 455/415; 455/462; 379/172; 379/142.07
(58) Field of Search .......................... 455/415, 462, 455/463, 461, 417, 458, 459, 460, 465, 426; 379/88.19, 88.2, 88.21, 142, 171, 172, 88.22, 88.23, 88.24, 142.06, 142.12, 142.07

(56) References Cited

U.S. PATENT DOCUMENTS

| | | | | |
|---|---|---|---|---|
| 5,325,420 A | * | 6/1994 | Kikuchi | 455/463 |
| 5,559,860 A | * | 9/1996 | Mizikovsky | 455/413 |
| 5,579,375 A | * | 11/1996 | Ginter | 455/417 |
| 5,809,417 A | * | 9/1998 | Nealon et al. | 455/426 |
| 5,903,628 A | * | 5/1999 | Brennan | 379/88.21 |
| 5,978,451 A | * | 11/1999 | Swan et al. | 379/88.24 |

\* cited by examiner

*Primary Examiner*—Nay Maung
*Assistant Examiner*—Ray Persino
(74) *Attorney, Agent, or Firm*—Farkas and Manelli

(57) ABSTRACT

A multiple handset cordless telephone includes a Caller ID/handset association table to identify a desired intended handset to receive an incoming call before the call is answered. When a match is made as between received call related information and a pre-stored entry in the Caller ID/handset association table, one or more intended handsets are provided with the subsequent ring signals and/or the subsequent voice conversation. If no match is found the cordless telephone operates otherwise in conventional fashion, i.e., all handsets ring in response to the incoming call, and any or all of the handsets may join the conversation at any time. The entries in the Caller ID/handset association table may be input manually using a keypad at the base unit or at any one of the handsets, or the received call related information with respect to a current, established incoming call may be stored as an entry in the Caller ID/handset association table and associated with the currently used handset or handsets upon activation of a unique code or dedicated button.

19 Claims, 4 Drawing Sheets

US 6,434,394 B1

MULTIPLE HANDSET CORDLESS TELEPHONE INCLUDING A RING SIGNAL/ CALL ROUTING MODULE

BACKGROUND OF THE INVENTION

1. Field of the Invention

This invention relates generally to a cordless telephone which receives caller information from an incoming telephone call. More particularly, it relates to a cordless telephone having multiple handsets and the capability to utilize call related information (e.g., Caller ID information) to identify an intended called party and thus route the incoming ring signal and/or voice conversation to only the designated handset.

2. Background of Related Art

Conventional cordless telephones having a base unit and multiple handsets are known in the art. Multiple handsets allow a number of users in a household to have their own private handset while allowing the efficiency and convenience of requiring only a single base unit to be connected to the telephone line. When an incoming call comes to a conventional base unit, all handsets are sent a ring signal, causing all handsets to ring and the possibility that any user might answer the incoming call.

FIG. 4 illustrates a conventional cordless telephone including a plurality of handsets.

In particular, in FIG. 4, a cordless telephone 11 is connected to a telephone company central office 13 via a telephone line 15. The cordless telephone 11 includes, e.g., three handsets 14a to 14c, and a base unit including a controller 19, an alpha-numeric keypad 32, a display 27, and a telephone line interface (TLI) 17. The cordless telephone 11 might also include a call related information detector/receiver 22 for receiving, e.g., Caller ID information such as a telephone number and/or household name of a calling party.

The telephone line interface (TLI) 17 provides the necessary isolation and DC and AC impedance as required by local telephone company standards. The telephone line interface 17 also provides a ring detect signal present on the telephone line 15 to the controller 19 for relay to all three handsets 14a to 14c when an incoming call is detected.

The call related information detector/receiver 22 can be incorporated within the cordless telephone 11, as illustrated in FIG. 4, or can be separate from the cordless telephone 11 but connected to the same telephone line 15 (not shown).

The call related information is typically transmitted from the telephone company central office 13 to the called party either while all handsets 14a to 14c of the called party's cordless telephone 11 are in an on-hook state (e.g., Type I Caller ID service), e.g., between the first two rings, or while any of the handsets 14a to 14c of the called party's cordless telephone 11 is in an off-hook state (e.g., Type II Caller ID/Call Waiting (CIDCW) service).

The detected and received call related information is typically displayed on the display 27 at the base unit of the cordless telephone 11 for any of the users of the multiple handsets 14a to 14c to view. Thus, by using a call related information service, e.g., Calling Identity Delivery (Caller ID), the user of the conventional cordless telephone 11 can determine the telephone number and/or household name of the calling party before the incoming call is answered. Thus, to determine who the incoming call might be intended for before answering, each of the users of the multiple handsets 14a to 14c must go the base unit and view the call related information.

It is often important and desirable that the calling party reach only an intended one of the plurality of users of the cordless telephone 11. Unfortunately, conventional cordless telephones having multiple handsets provide a ring signal to all handsets 14a to 14c in response to an incoming call and allow any user to converse with the calling party. Thus, when a calling party calls the conventional cordless telephone 11, all handsets 14a to 14c will ring or otherwise signal the presence of the incoming call and allow any user to enter the conversation regardless of which person the incoming telephone call is destined to.

One conventional solution to this problem is the installation of separate telephone lines and separate cordless telephones. However, this solution is costly both as to the cost of maintaining a plurality of telephone lines and as to the cost of a separate base unit for each telephone line. Moreover, the convenience of a single telephone number for any of a plurality of users would be lost.

Accordingly, there exists a need for an apparatus and method which improves privacy with a multiple handset cordless telephone by allowing a caller to ring only the intended handset of a multiple handset cordless telephone, and/or to converse only with the intended user.

SUMMARY OF THE INVENTION

In accordance with the principles of the present invention, a cordless telephone comprises a plurality of handsets, and a base unit associated with the plurality of handsets. The base unit includes a telephone line interface, a controller, a call related information receiver, a transceiver adapted to communicate with the plurality of handsets, and a call related information/handset association table accessible by the controller. The call related information/handset association table is adapted to contain entries associating particular call related information with a desired one of the plurality of handsets. The controller directs an incoming telephone call to only an intended one of the plurality of handsets based on a match determined as between call related information received with the incoming telephone and one of the entries in the call related information/handset association table.

In accordance with another aspect of the present invention, a cordless telephone system comprises a base unit including a telephone line interface. At least two handsets are associated with and supported by the base unit. A controller within the base unit is adapted to control operations of the cordless telephone system. A call related information detector/receiver is adapted to receive call related information with respect to an incoming call, and an incoming ring signal/call routing module is in communication with the controller. The incoming ring signal/call routing module is adapted to cause routing of at least one of a ring signal and a voice conversation with respect to the incoming call to one of the at least two handsets based on received call related information.

A method of call routing an incoming telephone to only a designated one of a plurality of handsets associated with a cordless telephone, in accordance with the principles of the present invention comprises receiving call related information with respect to an incoming call. Subsequent ring signals associated with the incoming call are routed to a designated one of the plurality of handsets based on a pre-stored association of call related information relating to the incoming call and the designated one of the plurality of handsets.

A method of call routing an incoming telephone call to a designated handset of a cordless telephone, the cordless telephone having multiple handsets associated with a single base unit, in accordance with another aspect of the present invention comprises storing a plurality of predetermined call related information. Call related information with respect to a caller is received. The received call related information with respect to the caller is compared to the stored plurality of predetermined call related information. At least one of a ring signal and the incoming telephone call are forwarded to only a designated one of the handsets if a match is found with respect to the comparison of the received call related information.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a multiple handset cordless telephone and method for directing a ring signal and/or an incoming telephone call to a desired one or more of a plurality of handsets based on received call related information, e.g., Caller ID information.

Figure 1:
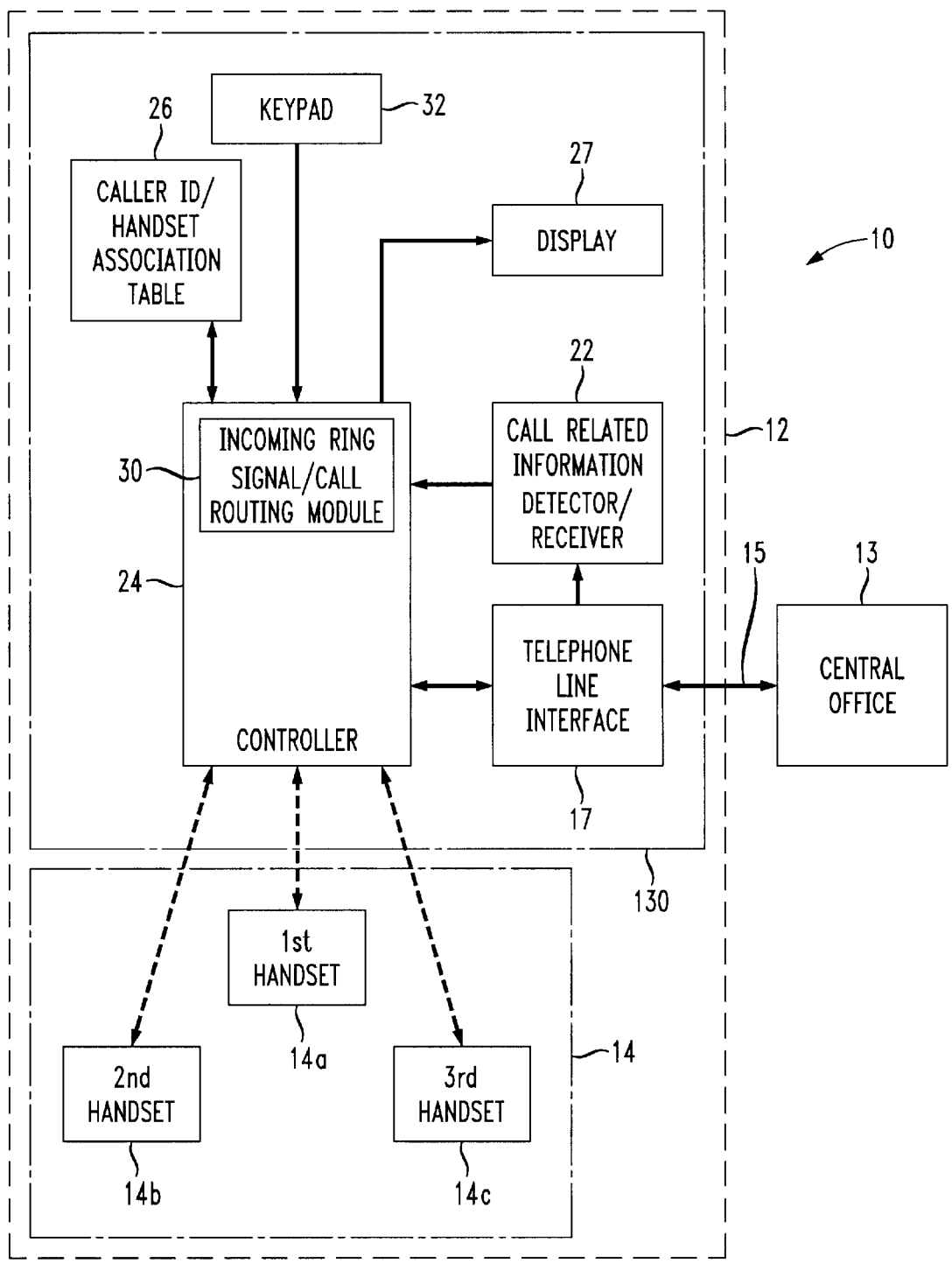
FIG. 1 shows a cordless telephone having multiple handsets and having the capability of signaling and/or routing a call only to a desired one of the multiple handsets in response to the detection of an incoming call based on received call related information, in accordance with the principles of the present invention.

FIG. 1 illustrates a multiple handset cordless telephone, indicated generally at 10, capable of directing a ring signal and/or an incoming telephone call to one or more handsets, in accordance with the principles of the present invention. The multiple handset cordless telephone 10 uses received call information to determine the disposition of any incoming telephone call to a designated handset or handsets, or to all handsets in conventional fashion if no designation is indicated or found.

The cordless telephone 10 utilizes widely available call related information services, e.g., Caller ID services, to identify the source of an incoming telephone call. Using all or a portion of the call related information, the intended recipient of the incoming telephone call can be determined before the incoming call is answered and without the need to view a display at a base unit showing the call related information.

In the embodiment of FIG. 1, the cordless telephone 10 includes a base unit 130 and a plurality of handsets 14, e.g., a first handset 14a, a second handset 14b, and a third handset 14c. The cordless telephone 10 further includes a telephone line interface (TLI) 17 to facilitate interconnection with a telephone company central office 13 via a telephone line 15.

A call information detector/receiver 22 is connected to the TLI 17 to receive call related information with respect to an incoming call, e.g., Caller ID information. The call related information may include, e.g., a telephone number and/or a household name associated with the incoming call.

Importantly, the cordless telephone 10 includes a call related information (e.g., Caller ID)/handset association table 26 containing pre-stored data entries established by the user associating all or portions of call related information with a desired handset. The entries may be pre-stored by the user upon input on keypad 32 based on prompting by the controller 24 on the display 27. Alternatively, the pre-stored entries may be established historically as each call is made based on empirical information, e.g., the handset which is in use last before the incoming call is terminated. The pre-stored entries in the Caller ID/handset association table 26 may alternatively be entered by the controller 24 upon manual triggering, e.g., by the activation of a 'enter received call information for current handset' during a current incoming call.

The controller or processor 24 compares the received call related information with pre-stored call related information entries maintained in a database, table or other suitable data storage method. The pre-stored information in the Caller ID/handset association table 26 may include all or portions of telephone numbers, area codes and/or household names, and is accessible by the controller 24. The controller 24 may be any suitable processor, e.g., a microprocessor, a microcontroller, or a digital signal processor (DSP). The controller 24 identifies which particular handset 14a, 14b, and/or 14c that the incoming telephone call is intended for by determining which one or more of the handsets 14a to 14c may be associated with a matched entry in the Caller ID/handset association table 26.

When a match between the received call related information and an entry in the Caller ID/handset association table 26 is found, the designated handset 14a, 14b and/or 14c may be alerted to the incoming telephone call with a personalized ring tone or other signal. Preferably only the designated handset 14a, 14b and/or 14c would be alerted to the incoming telephone call with a ring signal, e.g., by encoding the ring signal from the base unit 130 to the particular handset 14a to 14c to correspond with a unique key code contained in the desired handset 14a, 14b and/or 14c. The non-designated handsets 14a, 14b, and/or 14c, would not be signaled with the ring signal and thus would remain quiet in response to the incoming telephone call.

Preferably, the non-designated handsets 14a, 14b and/or 14c would be isolated from communicating on the telephone line 15 at that time. The specialized or personalized ring tone could also be used to identify whether an incoming telephone call is business related or personal related, which is particularly useful where a single telephone line 15 is being utilized for both purposes. The unique ring signal (e.g., indicating a business or personal call) can be determined from the relevant matched entry in the Caller ID/handset association table 26.

Figure 2:
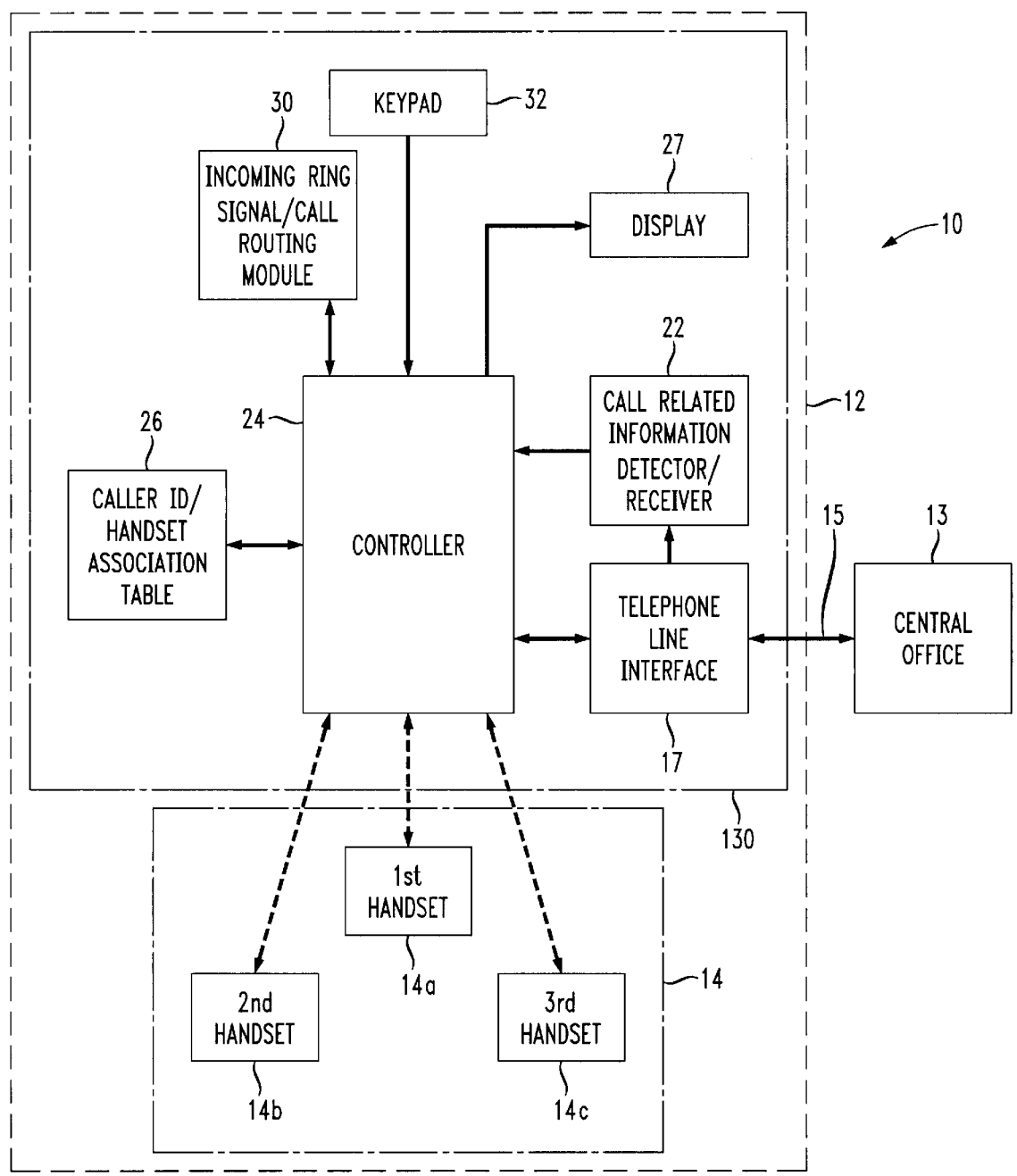
FIG. 2 shows another embodiment of a cordless telephone having multiple handsets and an incoming call routing module utilizing call related information received with an incoming call, in accordance with the principles of the present invention.

The cordless telephone 10 further includes an incoming ring signal/call routing module 30. The incoming ring signal/call routing module 30 is preferably a software module in the program code of the controller 24 and operates to route the ring signal and/or the underlying telephone call including the voice conversation of an incoming telephone call to an intended handset or handsets 14a, 14b and/or 14c. The ring signal and/or call is routed to the desired handset or handsets 14a to 14c based on a handset identified by a matched entry in the Caller ID/handset association table 26. FIG. 2 shows that the incoming ring signal/call routing module 30 can be implemented separate from the controller 24, but regardless will preferably be in communication with the controller 24, in accordance with the principles of the present invention.

In FIGS. 1 and 2, if no entry in the Caller ID/handset association table 26 matches received call related information, or if no call related information is received with respect to a particular incoming call, preferably all handsets 14a to 14c will receive both the ring signal and the voice conversation of an incoming call as in conventional multiple handset cordless telephones. Moreover, the cordless telephone 10 preferably provides a ring signal to all handsets 14a, 14b and 14c if the ring signal to a particular designated handset 14a, 14b or 14c goes unanswered for a predetermined number of rings, providing the highest probability that someone would answer the telephone if the person utilizing the designated handset is not available.

Figure 3:
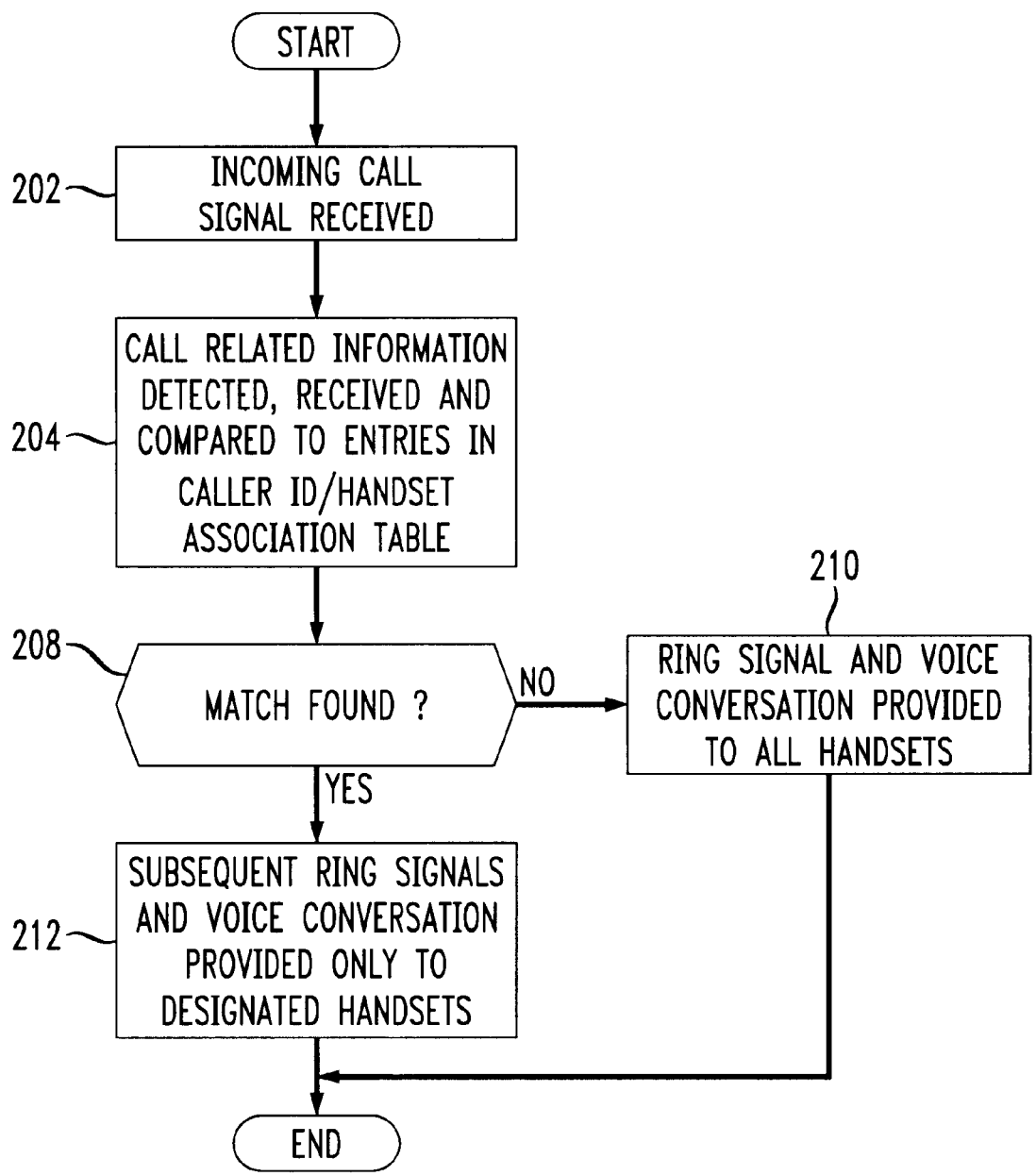
FIG. 3 is a flow chart illustrating an exemplary process by which the ring signal and/or incoming telephone call can be routed only to a desired one of a plurality of handsets of a multiple handset cordless telephone as shown in FIGS. 1 or 2.
Figure 4:
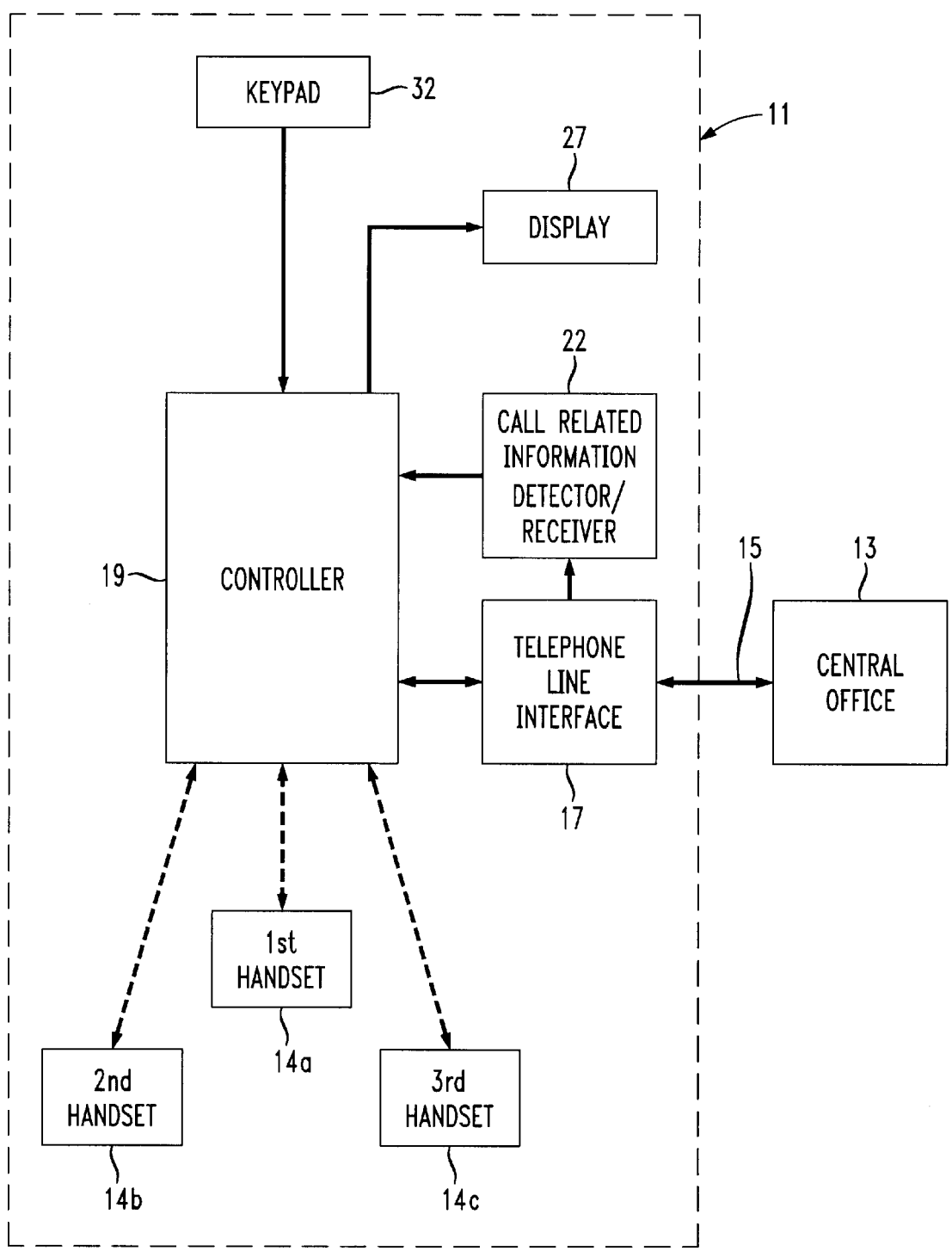
FIG. 4 shows a conventional cordless telephone having a plurality of handsets.

FIG. 3 illustrates a flow chart showing an exemplary process by which the cordless telephone 10 of FIGS. 1 and 2 automatically routes a ring signal and or voice conversation of an incoming telephone call to only a designated handset or handsets 14a, 14b and/or 14c. This allows increased privacy as between the calling and intended called parties because the incoming call rings only at the designated handset 14a, 14b and/or 14c, and because the cordless telephone 10 further has the capability to route the voice conversation from the incoming caller only to the intended handset 14a, 14b and/or 14c.

With reference to FIG. 3 (and FIGS. 1 and 2), in step 202, a first ring signal relating to an incoming call is received at the multiple handset cordless telephone 10 of the present invention from the relevant telephone line 15. At this point no handset is provided with a ring signal.

In step 204, call related information with respect to the caller is detected and received by the call related information detector/receiver 22, and compared by the controller 24 to entries contained in the Caller ID/handset association table 26.

In step 208, the controller 24 determines whether or not a match between all or a portion (e.g., an area code or family name) of the received call related information and an entry in the Caller ID/handset association table 26 was found. If a match was not found, the cordless telephone 10 defaults to conventional operation, i.e., providing subsequent ring signals and the subsequent voice conversation from the telephone line 15 to all handsets 14a to 14c, as shown in step 210. If, on the other hand, a match was found, all subsequent ring signals and the subsequent voice conversation is provided only to the handsets 14a, 14b and/or 14c which were designated by the matched entry in the Caller ID/handset association table 26.

Each entry in the Caller ID/handset association table 26 can be comprised of, e.g., a telephone number, an area code, and/or a household name or other call related information together with a unique identity of one or more of the multiple handsets 14a, 14b and/or 14c which are to receive the ring signals and/or voice conversation relating to that incoming call. Preferably, all handsets which qualify for receiving the ring signal will also receive the subsequent voice conversation from the telephone line. However, the present invention also encompasses more sophisticated scenarios, e.g., where perhaps all telephones receive the ring signal for a call from the caller indicated in the table entry, but perhaps only one of the handsets 14a, 14b or 14c receives the subsequent voice conversation. This type scenario might be best suited to a manual 'acceptance' of an incoming call from only one of the plurality of handsets after the incoming call has been established with all handsets. this manual acceptance would then disable the voice transmission to the other handsets 14a to 14c until the termination of the current incoming call. This allows, e.g., a parent to answer an incoming call, let a child know that the telephone call is intended for them, and then allow the child to 'accept' and thus lock out the conversation from their parents handset for the remainder of the telephone conversation to allow the child the security of a private conversation.

The entries in the Caller ID/handset association table 26 may alternatively be input based, at least in part, on speed dial numbers currently programmed into the base unit 130 and/or a particular handset 14a, 14b or 14c. The Caller ID/handset association table 26 is preferably maintained in non-volatile memory (e.g., Flash memory) accessible by the controller 24.

For home business users, the cordless telephone 10 of the present invention can provide immediate audible notification as to whether the incoming telephone call is a business call or a personal call based on call related information. For instance, full or partial call related information (e.g., just an area code) can be pre-stored in the Caller ID/handset association table 26 relating to business calls, and the same for personal calls, with business calls perhaps being routed to one handset located in an office and another handset located in a home area.

A multiple handset cordless telephone in accordance with the principles of the present invention offers each user increased privacy with respect to incoming telephone calls by limiting the likelihood of telephone calls being answered by unintended persons. Furthermore, the cordless telephone of the present invention limits interruption and distraction resulting from answering calls intended for another person in the household being answered by the wrong person, the need for that person to locate the intended person, wait for the intended person to pick up on their handset, and then to hang up the originally answered handset. Thus, the use of uniquely routed ring signals and/or voice conversations with only desired handsets, particularly with respect to frequent callers (e.g., a family member, a spouse, or a significant other), allow only the desired party to be notified of and answer incoming calls intended for them. Moreover, the present invention provides the capability of automatic routing of an incoming call to a desired handset and thus does not require any of the users to return to the base unit to assess the displayed call related information to determine the intended called party.

The present invention is applicable to the specific routing of only a ring signal to a desired handset, and/or the specific routing of the voice signal of the incoming call to the desired handset. Thus, while specific routing of a ring signal helps avoid the inconvenience of a wrong user answering an incoming telephone call, specific routing of the voice signal provides a level of security such that an undesired handset is not able to communicate over the telephone line 15 during the duration of that call. With specific routing of the voice signal to only a desired handset, the control signals from the other, undesired handsets may be temporarily disabled for the duration of the incoming call such that only the desired handset can answer the incoming call and place the cordless telephone in an off-hook state.

While the invention has been described with reference to the exemplary embodiments thereof, those skilled in the art will be able to make various modifications to the described embodiments of the invention without departing from the true spirit and scope of the invention.

What is claimed is:

1. A cordless telephone, comprising:
   a plurality of handsets;
   a base unit associated with said plurality of handsets, said base unit including:
      a telephone line interface,
      a controller,
      a call related information receiver,
      a transceiver adapted to communicate with said plurality of handsets, and
      a call related information/handset association table accessible by said controller, said call related information/handset association table being adapted to contain entries associating particular call related information with a desired one of said plurality of handsets;
   wherein said controller directs an only an incoming telephone ring signal to an intended one of said plurality of handsets based on a match determined as between call related information received with said incoming telephone and one of said entries in said call related information/handset association table such that a remainder of said plurality of handsets are excluded from participating in said incoming telephone call when said intended one of said plurality of handsets responds to said incoming call ring signal.

2. The cordless telephone according to claim 1, wherein:
   said call related information receiver is a Caller ID information receiver.

3. A cordless telephone system, comprising:
   a base unit including a telephone line interface;
   at least two handsets associated with and supported by said base unit;
   a controller within said base unit adapted to control operations of said cordless telephone system;
   a call related information detector/receiver adapted to receive call related information with respect to an incoming call; and
   an incoming ring signal/call routing module in communication with said controller, said incoming ring signal/call routing module being adapted to cause routing only a ring signal with respect to said incoming call to one of said at least two handsets based on received call related information table such that a remainder of said plurality of handsets are excluded from participating in said incoming telephone call when said one of said at least two handsets responds to said incoming call ring signal.

4. The cordless telephone system according to claim 3, wherein:
   said call related information is Caller ID information.

5. A method of routing an incoming telephone call to a designated one of a plurality of handsets associated with a cordless telephone, said method comprising:
   receiving call related information with respect to an incoming call; and
   routing only a ring signal associated with said incoming call to only said designated one of said plurality of handsets based on a pre-stored association of call related information relating to said incoming call and said designated one of said plurality of handsets.

6. The method of routing an incoming telephone call to a designated one of a plurality of handsets associated with a cordless telephone according to claim 5, further comprising:
   comparing said received call related information to information in a call related information/handset association table, to determine said designated one of said plurality of handsets.

7. The method of routing an incoming telephone call to a designated one of a plurality of handsets associated with a cordless telephone according to claim 5, wherein:
   said routing of said at least one of said ring signal and said voice conversation to said designated one of said plurality of handsets is based on a match between said received call related information and information in a call related information/handset association table.

8. A method of routing an incoming telephone call to only a designated handset of a cordless telephone, said cordless telephone having multiple handsets associated with a single base unit, said method comprising:
   receiving call related information with respect to a caller;
   comparing said received call related information with respect to said caller to a stored plurality of predetermined call related information; and
   forwarding only a ring signal to only a designated one of said multiple handsets if a match is found with respect to said comparison of said received call related information such that a remainder of said multiple handsets are excluded from participating in said incoming telephone call when said one of said multiple handsets responds to said ring signal.

9. The method of routing an incoming telephone call to a designated handset of a cordless telephone, said cordless telephone having multiple handsets associated with a single base unit according to claim 8, wherein:
   said predetermined call related information is stored by acceptance of current call related information relating to a currently established telephone call.

10. The method of routing an incoming telephone call to a designated handset of a cordless telephone, said cordless telephone having multiple handsets associated with a single base unit according to claim 9, wherein:
    said predetermined call related information is further stored with an association to a currently used one of said multiple handsets.

11. The method of routing an incoming telephone call to a designated handset of a cordless telephone, said cordless telephone having multiple handsets associated with a single base unit according to claim 8, further comprising:
    forwarding said caller to all of said multiple handsets if a match is not found with respect to said comparison of said call related information.

12. The method of routing an incoming telephone call to a designated handset of a cordless telephone, said cordless telephone having multiple handsets associated with a single base unit according to claim 8, further comprising:
    ringing each of said plurality of handsets if said designated one of said multiple handsets remains unanswered after a predetermined number of rings.

13. Apparatus for routing an incoming telephone call to only a designated one of a plurality of handsets associated with a cordless telephone, comprising:
    means for receiving call related information with respect to an incoming call;
    means for routing only a ring signal associated with said incoming call to only a designated one of said plurality of handsets based on a pre-stored association of call related information relating to said incoming call and said designated one of said plurality of handsets.

14. The apparatus for routing an incoming telephone call to a designated one of a plurality of handsets associated with a cordless telephone according to claim 13, further comprising:

means for comparing said received call related information to information in a call related information/handset association table, to determine said designated one of said plurality of handsets.

15. The apparatus for routing an incoming telephone call to a designated one of a plurality of handsets associated with a cordless telephone according to claim 13, wherein:

said routing of said at least one of said ring signal and said voice conversation to said designated one of said plurality of handsets is based on a match between said received call related information and information in a call related information/handset association table.

16. Apparatus for routing an incoming telephone call to only a designated handset of a cordless telephone, said cordless telephone having multiple handsets associated with a single base unit, comprising:

means for storing a plurality of predetermined call related information;

means for receiving call related information with respect to a caller;

means for comparing said received call related information with respect to said caller to said stored plurality of predetermined call related information; and means for forwarding only a ring signal to only said designated one of said multiple handsets if said means for comparing determines a match such that a remainder of said multiple handsets are excluded from participating in said incoming telephone call when said one of said multiple handsets responds to said ring signal.

17. The apparatus for routing an incoming telephone call to a designated handset of a cordless telephone, said cordless telephone having multiple handsets associated with a single base unit according to 16, wherein:

said predetermined call related information is stored by acceptance of current call related information relating to a currently established telephone call.

18. The apparatus for routing an incoming telephone call to a designated handset of a cordless telephone, said cordless telephone having multiple handsets associated with a single base unit according to claim 17, wherein:

said predetermined call related information is further stored with an association to a currently used one of said multiple handsets.

19. The apparatus for routing an incoming telephone call to a designated handset of a cordless telephone, said cordless telephone having multiple handsets associated with a single base unit according to claim 16, further comprising:

means for forwarding said caller to all of said multiple handsets if said means for comparing does not find a match with respect to said comparison of said call related information.

\* \* \* \* \*